United States Patent Office 3,792,130

Patented Feb. 12, 1974

3,792,130

ALKOXYIMINO-PHOSPHORUS COMPOUNDS

Leonard J. Stach, Riverside, Ill., assignor to Velsicol Chemical Corporation, Chicago, Ill.

No Drawing. Filed Nov. 29, 1971, Ser. No. 203,006
Int. Cl. C07f *9/08, 9/16;* A01n *9/36*
U.S. Cl. 260—944 6 Claims

ABSTRACT OF THE DISCLOSURE

This invention discloses new compounds of the formula

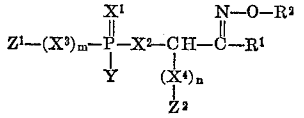

wherein $R^1$ is selected from the group consisting of alkyl, phenyl, halophenyl, alkylphenyl and alkyl-halophenyl; $R^2$ is alkyl; $X^1$, $X^2$, $X^3$ and $X^4$ are independently selected from the group consisting of oxygen and sulfur; *m* and *n* are each integers from 0 to 1; $Z^1$ is selected from the group consisting of alkyl, alkenyl and

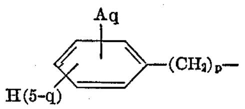

wherein A is selected from the group consisting of alkyl, alkenyl, alkoxy, alkylthio, halogen, nitro, alkylsulfoxide, alkylsulfone and dialkylamino; *q* is an integer from 0 to 5, and *p* is an integer from 0 to 3; $Z^2$ is selected from the group consisting of hydrogen and $Z^1$, provided that when $Z^2$ is hydrogen then *n* is zero; and Y is selected from the group consisting of alkyl, alkenyl, alkoxy, alkylthio, amino, alkylamino, dialkylamino and

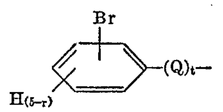

wherein B is selected from the group consisting of alkyl, alkenyl, alkoxy, alkylthio, halogen, nitro, alkylsulfoxide, alkylsulfone and dialkylamino; *r* is an integer from 0 to 5; Q is selected from the group consisting of oxygen, sulfur, alkylene, alkyleneoxy and alkylenethio, and *t* is an integer from 0 to 1.

Also disclosed are insecticidal and acaricidal compositions comprising an inert carrier and an above described compound.

This invention relates to new compositions of matter and more specifically relates to new compounds of the formula

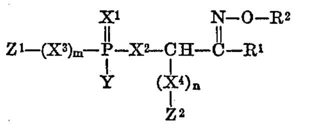

I wherein $R^1$ is selected from the group consisting of alkyl, phenyl, halophenyl, alkylphenyl and alkyl-halophenyl; $R^2$ is alkyl; $X^1$, $X^2$, $X^3$ and $X^4$ are independently selected from the group consisting of oxygen and sulfur; *m* and *n* are each integers from 0 to 1; $Z^1$ is selected from the group consisting of alkyl, alkenyl and

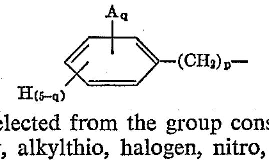

wherein A is selected from the group consisting of alkyl, alkenyl, alkoxy, alkylthio, halogen, nitro, alkylsulfoxide, alkylsulfone and dialkylamino; *q* is an integer from 0 to 5; and *p* is an integer from 0 to 3; $Z^2$ is selected from the group consisting of hydrogen and $Z^1$, provided that when $Z^2$ is hydrogen then *n* is zero; and Y is selected from the group consisting of alkyl, alkenyl, alkoxy, alkylthio, amino, alkylamino, dialkylamino and

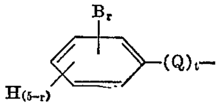

wherein B is selected from the group consisting of alkyl, alkenyl, alkoxy, alkylthio, halogen, nitro, alkylsulfoxide, alkylsulfone and dialkylamino; *r* is an integer from 0 to 5; Q is selected from the group consisting of oxygen, sulfur, alkylene, alkyleneoxy and alkylenethio, and *t* is an integer from 0 to 1.

In a preferred embodiment of the present invention $R^1$ is selected from the group consisting of lower alkyl, phenyl, chlorophenyl, bromophenyl and lower alkylphenyl; $R^2$ is lower alkyl; $X^1$, $X^2$, $X^3$ and $X^4$ are independently selected from the group consisting of oxygen and sulfur; *m* and *n* are each integers from 0 to 1; Z is selected from the group consisting of lower alkyl, lower alkenyl and

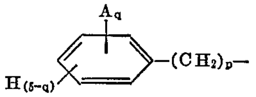

wherein A is selected from the group consisting of lower alkyl, lower alkenyl, lower alkoxy, lower alkylthio, chlorine, bromine, nitro and di(lower alkyl)amino; *q* is an integer from 0 to 3; and *p* is an integer from 0 to 3; $Z^2$ is selected from the group consisting of hydrogen and the preferred $Z^1$, provided that when $Z^2$ is hydrogen then *n* is 0; and Y is selected from the group consisting of lower alkyl, lower alkenyl, lower alkoxy, lower alkylthio, amio, lower alkylamino, di(lower alky)amino and

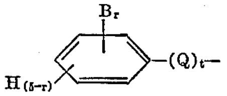

wherein B is selected from the group consisting of lower alkyl, lower alkenyl, lower alkoxy, lower alkylthio, chlorine, bromine, nitro and di(lower alkyl)amino; *r* is an integer from 0 to 3; Q is selected from the group consisting of oxygen, sulfur, lower alkylene, lower alkyleneoxy and lower alkylenethio, and *t* is an integer from 0 to 1. The term lower as used herein designates a straight or branched carbon chain of up to about 6 carbon atoms.

The new compounds of the present invention are unexpectedly useful as pesticides, particularly as insecticides and acaricides. Thus, a further embodiment of the present invention resides in pesticidal compositions containing as the essential active ingredient a compound of the present invention. A still further embodiment of this invention is a method of controling pests, including insects and acarids by applying to these pests an effective amount of a compound of the present invention.

The new compounds of the present invention can be readily prepared by reacting a compound of the formula

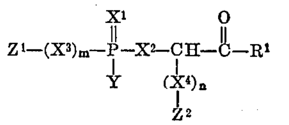

II wherein $Z^1$, $Z^2$, $X^1$, $X^2$, $X^3$, $X^4$, Y, $R^1$, *m* and *n* are as heretofore described with an excess molar amount of an alkoxyamine. This reaction can be effected by heating the reactants in an inert organic solvent such as ethanol in the presence of a base such as pyridine or sodium hydroxide which liberates the methoxyamine from its salt, for a period of from about ½ to about 24 hours. The heating can be conveniently carried out at the reflux temperature of the reaction mixture. After the reaction is completed, the reaction mixture can be stripped of organic solvent to yield the desired product as the residue. This residue can be used as such or can be purified by redissolving in ether and washing with water to remove the acid acceptor halide. The washed product can then be dried and recovered by distillation to yield the compound of this invention.

The compounds of Formula II can be prepared from an alkali metal phosphonamidate, phosphoramidate, phosphate, phosphonate or phosphinate of the formula

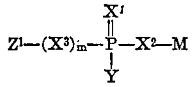

III wherein M is an alkali metal and $X^1$, $X^2$, $X^3$, $Z^1$, Y and $m$ are as heretofore described by reaction with a compound of the formula

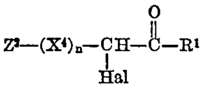

IV wherein Hal designates halogen, preferably chlorine or bromine, and $Z^2$, $X^4$, $R^1$ and $n$ are as heretofore described. This reaction can be effected by adding the compound of Formula IV or a solution of the compound of Formula IV in an inert organic solvent such as methyl ethyl ketone, to a solution of the compound of Formula III in an inert organic solvent. The reaction mixture can be heated at its reflux temperature with stirring for a period of from about 4 to about 48 hours. After the reaction is completed the reaction mixture can be filtered to remove the alkali metal halide which has formed. The desired product can be conveniently recovered as a residue upon evaporation of the solvents from the remaining solution. The product can then be used as such or can be further purified by washing, distillation or other common methods well known in the art.

The alkali metal phosphonamidates, phosphoramidates, phosphates, phosphonates, and phosphinates of Formula III which are used in the preparation of the compounds of this invention are known in the art and can be prepared by the methods described by Malatesta and Pizzotti, Chimica e Industria (Milan) 27, 6–10 (1945), and Melnikov and Grapov, Zhur. Vsesoyuz Obshchestva in D. I. Mendeleeva, 6, No. 1, 119–120 (1961).

Exemplary compounds of Formula IV useful for preparing the compounds of this invention are chloro-2-propanone, 1-chloro-2-butanone, 1-chloro - 2 - pentanone, 1-chloro-2-hexanone, 1-chloro - 2 - heptanone, 2-chloro-3-butanone, 3-chloro-2-pentanone, 1-chloro-1-phenyl-2-propanone, 1-bromo-1-phenoxy-2-propanone, chloromethyl phenyl ketone, 1-chloroethyl phenyl ketone, chloromethyl 4-chlorophenyl ketone and the like.

The manner in which the compounds of this invention can be prepared is more specifically illustrated in the following examples.

EXAMPLE 1

Preparation of S-acetylmethyl O-ethyl N-isopropylthiolophosphoramidate

Potassium O-ethyl N - isopropylthiolophosphoramidate (28.7 grams; 0.13 mol) and methyl ethyl ketone (120 ml.) were charged into a glass reaction vessel equipped with a mechanical stirrer, reflux condenser and an addition funnel. The mixture was heated to reflux and a solution of chloro-2-propanone (10 grams; 0.108 mol) in methyl ethyl ketone (30 ml.) was added dropwise with continuous stirring. After the addition was completed, stirring and heating at reflux were continued for a period of about 21 hours. After this time, the reaction mixture was cooled to room temperature and was filtered to remove insoluble salts. The salts were washed with acetone and the acetone wash was combined with the filtrate from the reaction mixture. The resulting mixture was stripped of solvents in a rotary evaporator to yield a red oil as the residue. The residue was dissolved in methylene chloride and the solution washed with water. The washed solution was dried over anhydrous magnesium sulfate and filtered. The filtrate was stripped of methylene chloride and the residue filtered through a sintered glass funnel to yield the desired product S-acetylmethyl O-ethyl N-isopropylthiolophosphoramidate as a dark red liquid.

EXAMPLE 2

Preparation of S-(2-methoxyiminopropyl) O-ethyl N-isopropylthiolophosphoramidate S - acetylmethyl O - ethyl N - isopropylthiolophosphoramidate (5.50 grams; 0.025 mol), methoxyamine hydrochloride (2.92 grams; 0.035 mol), ethanol (50 ml.) and pyridine (2.77 grams; 0.035 mol) were charged into a glass reaction flask equipped with stirrer, thermometer and reflux condenser. The reaction mixture was heated at reflux on a steam bath for a period of about 60 minutes. After this time, the ethanol was evaporated with an air stream and the residue was dissolved in ether (80 ml.). The ether solution was washed with water and was thereafter dried over anhydrous magnesium sulfate. The dried solution was filtered and stripped of ether leaving a liquid residue. This residue was distilled under reduced pressure to yield the desired product S-(2-methoxyiminopropyl) O-ethyl N - isopropylthiolophosphoramidate having a boiling point of 139–140° C. at 0.15 mm. of Hg pressure.

EXAMPLE 3

Preparation of S-acetylmethyl O,O-dimethyl thionothiolophosphate

Potassium O,O-dimethyl thionothiolophosphate (12.0 grams; 0.061 mol) chloroacetone (20.0 grams; 0.22 mol) and methyl ethyl ketone (100 ml.) were charged into a glass reaction vessel equipped with a mechanical stirrer and reflux condenser. The reaction mixture was stirred at room temperature for a period of about 30 minutes and was thereafter heated at reflux with continued stirring for a period of about 17 hours. After this time the mixture was cooled to room temperature and filtered to remove inorganic salts. The salts were washed with acetone and the acetone wash was combined with the filtrate from the reaction mixture. The resulting mixture was stripped of solvents in a rotary evaporator and the residue was dissolved in ether. The ether solution was washed with water, dried over anhydrous magnesium sulfate and filtered. The filtrate was stripped of ether and the liquid residue distilled under reduced pressure to yield the desired prouct S-acetylmethyl O,O-dimethyl thionothiolophosphate.

EXAMPLE 4

Preparation of S-(2-methoxyiminopropyl) O,O-dimethyl thionothiolophosphate

S-acetyl methyl O,O-dimethyl thionothiolophosphate (8.0 grams; 0.037 mol), methoxyamine hydrochloride (4.17 grams; 0.05 mol), ethanol (70 ml.) and pyridine (4.04 ml.; 0.05 mol) were charged into a glass reaction vessel equipped with a mechanical stirrer and reflux condenser. The reaction mixture was stirred and heated at the reflux temperature for a period of about 60 minutes. After this time the reaction mixture was cooled to room temperature and the ethanol and unreacted pyridine and methoxyamine were evaporated at room temperature with an air stream. The residue was dissolved in methylene chloride (100 ml.). The resulting solution was washed with water, dried over anhydrous magnesium sulfate and filtered. The filtrate was distilled to remove the methylene chloride leaving a liquid residue. This residue was filtered through a sintered glass funnel to yield the desired product S-(2-methoxyiminopropyl) O,O-dimethyl thionothiolophosphate.

Other compounds within the scope of this invention can be prepared by the procedures described in the foregoing examples. Presented in the following examples are the essential ingredients required to prepare the indicated named compounds according to the procedures heretofore described.

EXAMPLE 5

Potassium O,O-di-n-propyl phosphate+1-chloro-2-pentanone+ethoxyamine=O-(2-ethoxyiminopentyl) O,O-di-n-propyl phosphate.

EXAMPLE 6

Potassium O,O-di-n-hexyl phosphate+1-chloro-2-heptanone+n-pentoxyamine=O-(2-n - pentoxyiminoheptyl) O,O-di-n-hexyl phosphate.

EXAMPLE 7

Potassium S,S-diethyl trithiolothionophosphate+chloromethyl 4-chlorophenyl ketone+n-propoxyamine=S-[2-n-propoxyimino-2-(4-chlorophenyl)ethyl] S,S-diethyl trithiolothionophosphate.

EXAMPLE 8

Potassium O-allyl N,N-dimethylphosphoramidate+1-chloro-1 - methoxy-2-propanone+n-hexyloxyamine=O-(1-methoxy-2-n-hexyloxyiminopropyl) O-allyl N,N-dimethylphosphoramidate.

EXAMPLE 9

Sodium (2 - methyl - 4 - chlorophenyl)methylphosphinate+1-chloro-n-butyl 2-methyl-4 - bromophenyl ketone+methoxyamine=O-[1-n - propyl-2-methoxyimino-2-(2-methyl-4-bromophenyl)ethyl] (2-methyl - 4-chlorophenyl)methylphosphinate.

EXAMPLE 10

Potassium (2-methoxy-4-nitrophenyl) (2-dimethylamino - 5 - bromophenyl)phosphinate+1-bromo-1-(2-ethyl-4-chlorophenyl)-2 - propanone+methoxyamine=O-[1-(2-ethyl-4-chlorophenyl)-2-methoxyiminopropyl] (2-methoxy-4-nitrophenyl)(2 - dimethylamino - 5 - bromophenyl)phosphinate.

EXAMPLE 11

Potassium O-(2-n-butyl-4 - methylthiophenyl) phosphoramidate+1-chloro-1-(3 - methyl - 5-bromophenyl)-2-propanone+methoxyamine=O - [1-(3-methyl-5-bromophenyl)-2-methoxyiminopropyl] O-(2-n-butyl-4-methylthiophenyl) phosphoramidate.

EXAMPLE 12

Potassium O-(2-allyl-4-diethylaminophenyl) N,N-di-n-pentylphosphoramidate+1-chloro - 1 - (3-ethylthio-5-chlorophenyl) - 2 - propanone+ethoxyamine=O-[1-(3-ethylthio-5-chlorophenyl) - 2-ethoxyiminopropyl] O-(2-allyl-4-diethylaminophenyl) N,N-di-n - pentylphosphoramidate.

EXAMPLE 13

Potassium O-(2-n-hexyl-4-methylsulofonylphenyl) O-(2-methoxy-4-nitrophenyl) phosphate+1-chloro-1-(2-n-butyl - 4 - ethoxy-phenyl) - 2 - propanone+methoxyamine=O-[1 - (2-n-butyl-4-ethoxyphenyl) - 2-methoxyiminopropyl] O-(2-n-hexyl-4-methylsulfonylphenyl) O-(2-methoxy-4-nitrophenyl) phosphate.

EXAMPLE 14

Sodium O-(3-di-n-propylamino - 5-pentylthiophenyl) S-(2-n-butyl-4 - n-propoxyphenyl) thiolophosphate+1-chloro-1-(2-methylthio - 4 - ethylsulfonylbenzyl)-2-propanone+methoxyamine=O-[1-(2 - methylthio - 4-ethylsulfonylbenzyl)-2-methoxyiminopropyl] O-(3-di-n-propylamino-5-pentylthiophenyl S-(2-n-butyl - 4-n-propoxyphenyl) thiolophosphate.

Additional compounds within the scope of the present invention which can be prepared by the procedure detailed in the foregoing examples are:

O-[1-pentylthio-2-methoxyimino-2-(3-iodo-4-n-hexylphenyl)-ethyl] O-(2-iodo-4-methylsulfinylphenyl) methylphosphonate
O-(1-allyl-2-methoxyiminopropyl) O-(3-propoxy-5-bromophenyl) isopropylphosphonate
O-[1-(3-n-hexylsulfonylphenyl)-2-methoxyiminopropyl] O-(4-di-n-hexylaminophenyl) n-hexylphosphonate
O-[1-(2-n-hexyloxy-4-dimethylaminophenyl)-2-methoxyiminopropyl] O-(2-hexyloxy-4-n-butylsulfonylphenyl) allylphosphonate
O-[1-(3-n-butylthio-5-nitrophenyl)-2-ethoxyiminopropyl] O-(3-hexylsulfonylphenyl) S-methyl thiolophosphate
O-[1-(4-di-n-butylaminophenyl)-2-isopropoxyiminopropyl O-(4-n-propylsulfinylphenyl) S-n-butyl thiolophosphate
O-[1-(3-di-n-hexylaminophenyl)-2-methoxyiminopropyl] S-(4-n-hexylsulfonylphenyl) S-n-hexyl dithiolophosphate
O-[1-(2-n-hexylthiophenyl)-2-methoxyiminopropyl] O-(3-n-hexylsulfinylphenyl) N-n-pentylphosphoramidate
O-[1-(3-ethylsulfinyl-5-n-hexylphenyl)-2-methoxyiminopropyl] O-n-hex-3-enyl O-benzyl thionophosphate
O-[1-(4-n-hexylsulfinylphenyl)-2-methoxyiminopropyl] O-benzyl O-(2-n-hexyl-4-n-hexyloxyphenyl) phosphate
O-(1-hexylthio-2-methoxyiminopropyl) O-(2-phenylethyl)-2-allyl-4-iodophenylphosphonate
O-(1-phenoxy-2-methoxyiminopropyl) S-(3-phenylpropyl) 2-n-butylthio-4-n-butylsulfonylphenylthiolophosphonate
O-(2-methoxyiminobutyl) 4-chlorophenyl-(2-n-hexylthio-4-methylsulfinylphenyl)phosphinate
O-(2-methoxyiminopropyl) 4-phenylbutyl(3-di-n-hexylamino-5-ethylsulfinylphenyl)phosphinate For practical use as insecticides or acaricides, the compounds of this invention are generally incorporated into insecticidal or acaricidal compositions which comprise an inert carrier and an insecticidally or acaricidally toxic amount of such a compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carries such as the attapulgites or the vermiculites usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal or acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

EXAMPLE 15

Preparation of a dust

| | |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the insect or acarid infestation.

The compounds of this invention can be applied as insecticides or acaricides in any manner recognized by the art. One method for destroying insects or acarids comprises applying to the locus of the insect or acarid infestation, an insecticidal or acaricidal composition comprising an inert carrier and, as an essential active ingredient, in a quantity which is toxic to said insects or acarids, a compound of the present invention. The concentration of the new compounds of this invention in the insecticidal or acaricidal compositions will vary greatly with the type of formulation and the purpose for which it is designed, but generally the insecticidal or acaricidal compositions will comprise from about 0.05 to about 95 percent by weight of the active compounds of this invention. The compositions, in a preferred embodiment of this invention will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides or acaricides in the compositions heretofore described. These other insecticides or acaricides can comprise from about 5% to about 95% of the active ingredients in the compositions. Use of the combinations of these other insecticides or acaricides with the compounds of the present invention provide insecticidal and/or acaricidal compositions which are more effective in controlling insects or acarids and often provide results unattainable with separate compositions of the individual compounds. The other insecticides or acaricides with which the compounds of this invention can be used in the insecticidal or acaricidal compositions to control insects or acarids include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mexinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as insects or acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compounds applied to the soil or plant surfaces are taken up by the plant, and the insects or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm; worms or weevils, such as the codling moth, the alfalfa weevil, the cotton boll weevil, the pink boll worm, the plum curculio, the red banded leaf roller, the melonworm, the cabbage looper and the apple maggot; leaf miners, such as the apple leaf miner, the birch leaf miner and the beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect or acarid control will depend on a variety of factors, such as the specific insect involved, intensity of the infestation, weather, type of environment, type of formulation, and the like. For example, the application of only one or two ounces of active chemical per acre may be adequate for control of a light infestation of an insect or acarid under conditions unfavorable for its feeding, while a pound or more of active compound per acre may be required for the control of a heavy infestation of insects or acarids under conditions favorable to their development.

The insecticidal activity of the compounds of the present invention was demonstrated by experiments carried out for the control of a variety of insects.

In one experiment carried out for the control of the housefly each of fifty flies was contacted with a test compound by applying 1 $\mu l$ of test formulation, containing the indicated concentrations of active compound, to the dorsum of its thorax. The flies were then placed in a wire mesh cage where they were supplied with sugar syrup. At the end of a 24 hour period the mortality of the flies was observed and rated in comparison to a control. The results of this experiment are also shown in Table I.

The insecticidal activity of the compounds of this invention was further illustrated in experiments carried out for the control of the pea aphid (*Acyrthosiphon pisum*) by contact. In these experiments ten day old Laxton pea plants contained in small plastic pots were each infested with ten adult pea aphids. The plants and pea aphids were then sprayed with the test compound formulated as an aqueous emulsion of an acetone solution at various concentrations. The infested plants were then placed in a holding chamber maintained at a constant temperature for a period of 48 hours. After this time the mortality of the aphids was determined and rated on a percent basis in comparison to a control. The results of this experiment are shown in Table I.

The acaricidal activity of the compounds of the present invention was demonstrated in experiments carried out for the control of the two-spotted spider mite (*Tetranychus urticae*).

In one experiment wherein the activity of the compounds of the present invention as contact poisons was determined, the test compounds were formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites is determined and is rated on a percentage basis in comparison to untreated controls. The results of this experiment are shown in Table I.

TABLE I

| | Concentration, p.p.m. | Percent control | | |
|---|---|---|---|---|
| | | House-fly | Pea aphid | Two-spotted spider mite |
| Product of Ex. 2 | 1,000 | 100 | 100 | 100 |
| Product of Ex. 4 | 1,000 | 100 | 100 | 93 |

I claim:

1. A compound of the formula

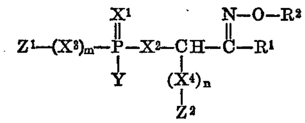

wherein $R^1$ is selected from the group consisting of lower alkyl, phenyl, halophenyl, lower alkylphenyl and lower alkyl-halophenyl; $R^2$ is lower alkyl; $X^1$, $X^2$, $X^3$ and $X^4$ are independently selected from the group consisting of oxygen and sulfur; *m* and *n* are each integers from 0 to 1; $Z^1$ is selected from the group consisting of lower alkyl, lower alkenyl and

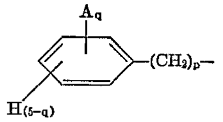

wherein A is selected from the group consisting of lower alkyl, lower alkenyl, lower alkoxy, lower alkylthio, halogen, nitro, lower alkylsulfoxide, lower alkylsulfone and and di(lower)alkylamino, *q* is an integer from 0 to 5, and *p* is an integer from 0 to 3; $Z^2$ is selected from the group consisting of hydrogen and $Z^1$, provided that when $Z^2$ is hydrogen then n is zero; and Y in selected from the group consisting of lower alkyl, lower alkenyl, lower alkoxy, lower alkylthio, amino, lower alkylamino, di(lower) alkylamino and

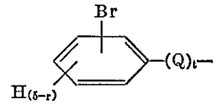

wherein B is selected from the group consisting of lower alkyl, lower alkenyl, lower alkoxy, lower alkylthio, halogen, nitro, lower alkylsulfoxide, lower alkylsulfone and di-(lower)alkylamino; *r* is an integer from 0 to 5, Q is selected from the group consisting of oxygen, sulfur, lower alkylene, lower alkyleneoxy and lower alkylenethio, and *t* is an integer from 0 to 1.

2. The compound of claim 1, S-(2-methoxyiminopropyl) O-ethyl N-isopropylthiolophosphoramidate.

3. The compound of claim 1, S-(2-methoxyiminopropyl O,O-dimethyl thionothiolophosphate.

4. The compounds of claim 1, O-(2-methoxyiminopropyl) O-methyl N,N-dimethylphosphoramidate.

5. The compound of claim 1, O-(2-methoxyimino-2-phenylethyl) O-ethyl N-isopropylthiolophosphoramidate.

6. The compound of claim 1, S-(2-ethoxyiminopropyl) O-methyl N-isopropylthiolophosphoramidate.

References Cited

UNITED STATES PATENTS 3,574,793 4/1971 Ritchter et al. ........ 260—944

ANTON H. SUTTO, Primary Examiner

U.S. Cl. X.R.

260—946, 968, 979; 424—211